United States Patent [19]

Kadota

[11] Patent Number: 4,807,681
[45] Date of Patent: Feb. 28, 1989

[54] PNEUMATIC RADIAL TIRES FOR AIRPLANES

[75] Inventor: Kuninobu Kadota, Kodaira, Japan

[73] Assignee: Bridgestone Corporation, Tokyo, Japan

[21] Appl. No.: 102,924

[22] Filed: Sep. 30, 1987

[30] Foreign Application Priority Data

Jun. 17, 1987 [JP] Japan .................................. 62-149231

[51] Int. Cl.$^4$ .............................................. B60C 9/20
[52] U.S. Cl. .................................... 152/531; 152/535; 152/538
[58] Field of Search ................ 152/526, 527, 528, 529, 152/531, 535, 538, 560

[56] References Cited

U.S. PATENT DOCUMENTS

| | | | |
|---|---|---|---|
| 3,881,538 | 5/1975 | Mirtain | 152/527 |
| 4,050,497 | 9/1977 | Pakur et al. | 152/361 |
| 4,183,389 | 1/1980 | Grosch | 152/528 |
| 4,240,488 | 12/1980 | Wilcox | 152/531 X |
| 4,402,356 | 9/1983 | Musy | 152/193 |

FOREIGN PATENT DOCUMENTS

| | | |
|---|---|---|
| 71497/74 | 1/1976 | Australia . |
| 0174147 | 3/1986 | European Pat. Off. . |
| 2195533 | 3/1974 | France . |
| 61-196804 | 1/1986 | Japan . |
| 2017019 | 9/1979 | United Kingdom . |
| 1603059 | 11/1981 | United Kingdom . |

OTHER PUBLICATIONS

Patent Abstracts of Japan, vol. 10, No. 142 (M–481) [2199], May 24, 1986; & JP-A-61 1507 (Sumitomo Gomu Kogyo K.K.) 7-01-1986.

*Primary Examiner*—Michael W. Ball
*Assistant Examiner*—Ramon R. Hoch
*Attorney, Agent, or Firm*—Sughrue, Mion, Zinn, Macpeak, and Seas

[57] ABSTRACT

A pneumatic radial tire for airplanes comprises a carcass composed of plural organic fiber cord plies and a belt composed of a combination of cross belt layer structure and circumferential belt layer structure. The cross belt layer structure is comprised of at least two organic fiber cord layers, the cords of which layers being crossed with each other, and the circumferential belt layer structure is comprised of at least two organic fiber cord layers in such a manner that the number of cross belt layers is made larger at both side regions of the tread than at the central region thereof and the number of circumferential belt layers is made larger at the central region than at both side regions.

8 Claims, 5 Drawing Sheets

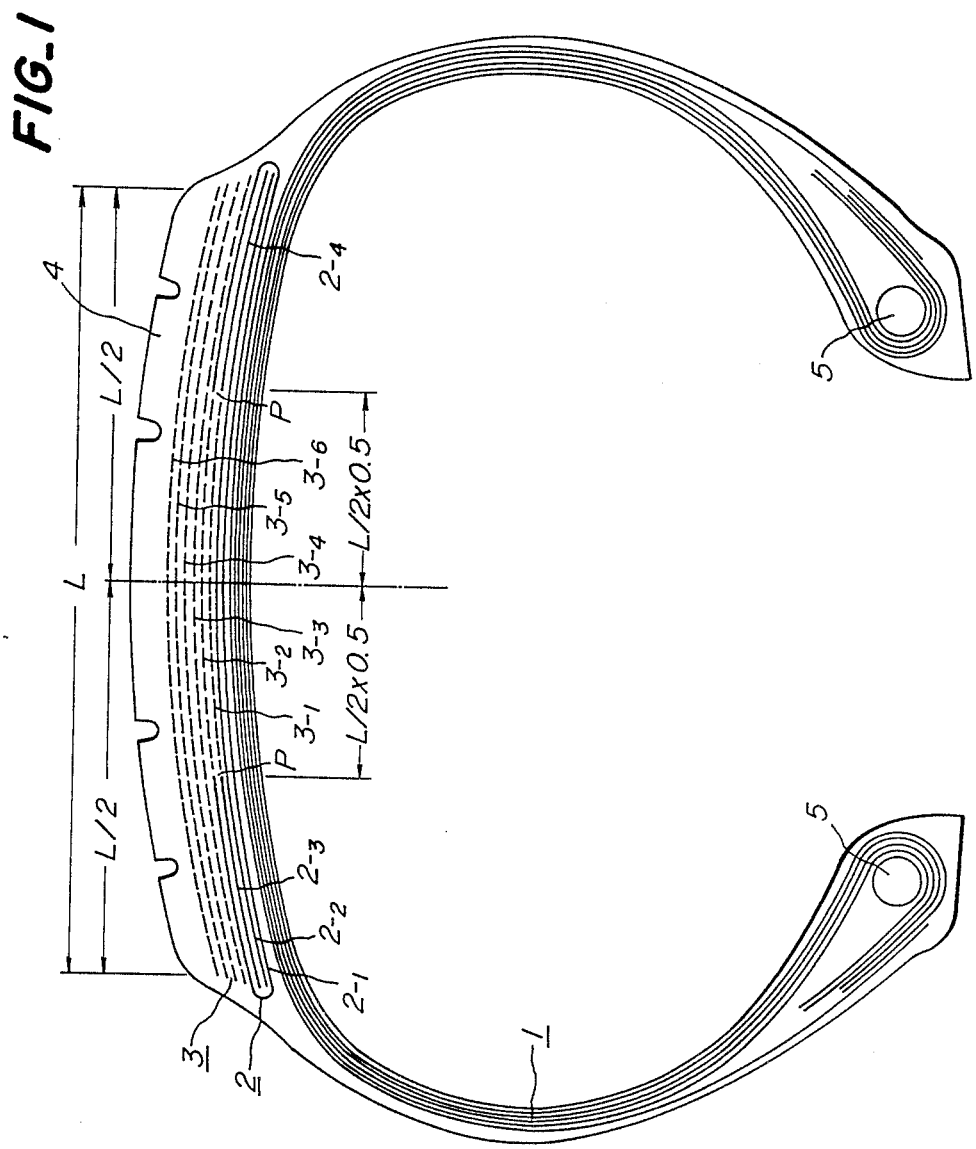
FIG_1

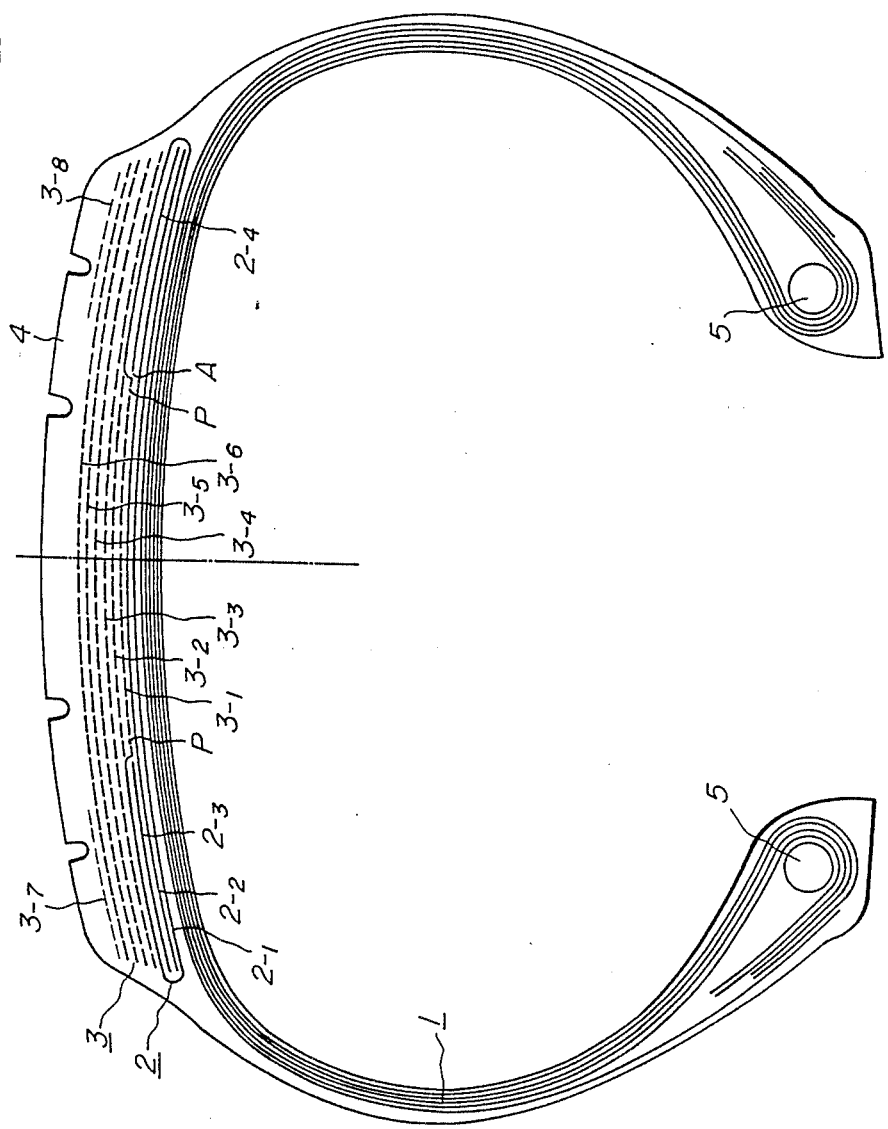

FIG_3a
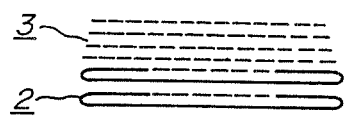
FIG_3c
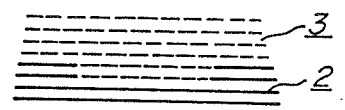
FIG_3b
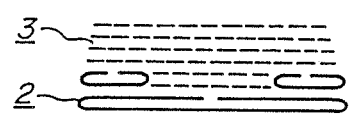
FIG_3d
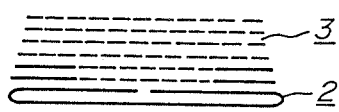

FIG_4
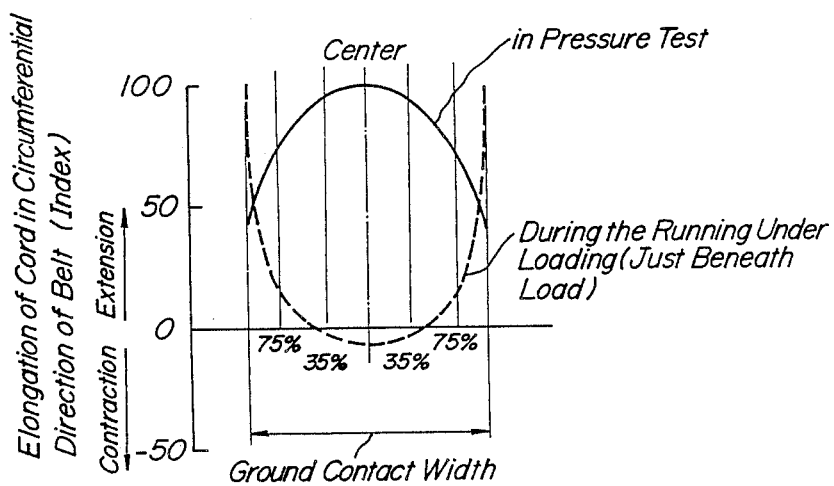

FIG_5a
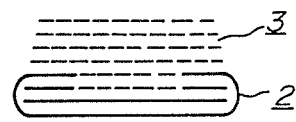
FIG_5b
PRIOR ART
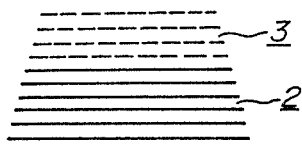
FIG_5c
PRIOR ART
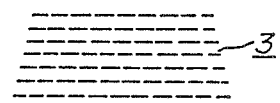
FIG_5d
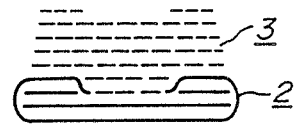

PNEUMATIC RADIAL TIRES FOR AIRPLANES

BACKGROUND OF THE INVENTION

1. Field of the Invention

This invention relates to pneumatic radial tires for airplanes used at high speed under high loading, and more particularly to a pneumatic radial tire for airplanes having improved service durability and resistance to uneven wear by the improvement of the belt structure.

2. Relates Art Statement

Since radial or semi-radial tires for airplanes are particularly used at high speed, they comprise a belt composed of plural belt layers each containing cords arranged substantially in parallel to an equator of the tire (hereinafter represented as a circumferential direction) from a viewpoint of the resistance to the standing wave phenomenon. This belt structure is advantageous in the weight reduction of tire because the pressure test required for the airplane tire (no occurrence of bust under a pressure corresponding to 4 times of service internal pressure) can be satisfied by the minimum number of belt layers, which is useful in view of the weight and low heat buildup exerting on the service cost of the airplane. In this belt structure, however, cords for the belt layer are arranged in the circumferential direction, so that they hardly extend or contract during the running of the tire. Furthermore, since the tire diameter is smaller in the tread shoulder than in the tread center, the tread shoulder portion is dragged during the running of the tire to cause uneven wear. In order to solve this problem, therefore, the following belt structure has been proposed.

That is, such a belt structure is a combination of circumferential belt layer containing cords arranged in parallel to the equator of the tire and a cross belt layer containing cords crossed with the equator. This is disclosed in U.S. Pat. No. 4,402,356.

In this belt structure, as the number of cross belt layers increases as compared with the number of circumferential belt layers, the occurrence of uneven wear can be reduced. However, the cross belt layer is low in circumferential rigidity as compared with the circumferential belt layer, so that the total number of belt layers necessarily increases for satisfying the pressure test, which is disadvantageous in view of the tire weight. And also, the total thickness of the belt structure undesirably increases, resulting in the increase of heat buildup to lower the service durability against separation failure of the belt.

SUMMARY OF THE INVENTION

It is, therefore, an object of the invention to provide a belt structure in a pneumatic radial tire for airplanes which can advantageously solve the aforementioned problems and satisfies the improvement of resistance to uneven wear and service durability.

The inventors have made detail examinations with respect to deformation behavior of the belt structure having a combination of circumferential belt layer and cross belt layer in the pressure test and during the running of the tire in order to prevent the occurrence of uneven wear and the degradation of service durability due to the increase of heat buildup based on the increase of the belt layer number. They have found that the resistance to uneven wear and service durability are effectively improved by changing the belt structure at the central region and side region of the tread.

According to the invention, there is the provision of a pneumatic radial tire for airplanes, comprising a toroidal carcass composed of plural plies each containing organic fiber cords arranged in parallel with each other and at a cord angle of 70°~90° with respect to an equatorial plane of the tire, at least one of which plies being wound around each of a pair of bead cores from inside of the tire toward outside thereof to form a turnup, and a belt superimposed about a crown portion of said carcass and composed of a combination of cross belt layer structure and a circumferential belt layer structure; said cross belt layer structure being comprised of at least two cord layers each containing organic fiber cords arranged in parallel with each other and at a cord angle of 10°~70° with respect to the equatorial plane of the tire, the cords of which layers being crossed with each other; said circumferential belt layer structure being comprised of at least two cord layers each containing organic fiber cords arranged in parallel with each other and substantially in parallel to the equatorial plane of the tire; the number of cord layers at a side region of the tire tread in said cross belt layer structure being larger than that at a central region thereof, and the number of cord layers at the central region of the tread in said circumferential belt layer structure being larger than that at the side region thereof, and at least one of said cord layers in said circumferential belt layer structure being a continuous layer extending between both side regions of the tread.

Moreover, the preferred embodiments of the invention are as follows.

That is, the cross belt layers arranged only on both side regions of the tread and the circumferential belt layer arranged on the central region of the tread locate at substantially an equal distance from the rotational axis of the tire and form substantially a single layer, and the discontinuous point between the cross belt layer and the circumferential belt layer locates at a distance from the tread center corresponding to 35~75% of a length between the center of the ground contact width of the tread and the ground contact end. At least one of the cross belt layers is a continuous layer extending between the both side regions of the tread. The cords of the circumferential and cross belt layers are made from the organic fibers of the same material. At least one of the cross belt layers is a folded layer. The absolute value of the difference in the number of circumferential belt layers between the central region and the side region is smaller than the absolute value of the difference in the number of cross belt layers between the side region and the central region. A pair of circumferential belt layers are further arranged outward in the radial direction of the tire on only both side regions of the circumferential belt layer continuously extending between both side regions of the tread, and the end thereof facing the tread center locates at a distance from the tread center corresponding to 35~75% of a length between the center of the ground contact width of the tread and the ground contact end. Furthermore, the cross belt layer arranged inward in the radial direction of the tire is adjoined to the carcass.

BRIEF DESCRIPTION OF THE DRAWINGS

The invention will be described with reference to the accompanying drawings, wherein:

FIGS. 1 and 2 are schematically sectional views of the airplane tire according to the invention, respectively;

FIGS. 3a~3d are schematic views of the belt structure according to the invention, respectively;

FIG. 4 is a graph showing an extension of cord in circumferential direction over a whole of the tread in the widthwise direction; and FIGS. 5a~5d are schematic views of some embodiments of the belt structure, respectively.

DESCRIPTION OF THE PREFERRED EMBODIMENTS

In FIG. 1 is shown an embodiment of the airplane tire according to the invention, wherein numeral 1 is a carcass, numeral 2 a cross belt layer structure, numeral a circumferential belt layer structure, numeral 4 a tread and numeral 5 a bead core.

The carcass 1 has an up and down lamination structure consisting of four turnup plies turned around the bead core 5 from inside of the tire toward outside thereof and a single down ply extending downward along the outside of the turnup portion toward the bead toe in the illustrated embodiment.

The cross belt layer structure 2 is comprised of one belt layer $2_{-1}$ folding inward at both side ends of the tread, one belt layer $2_{-2}$ arranged inside the above folded belt layer $2_{-1}$ and continuously extending between both side regions, and a pair of belt layers $2_{-3}$, $2_{-4}$ each arranged only at each side region of the tread, all of which belt layers containing organic fiber cords therein. In this structure, therefore, two belt layers are existent in the central region of the tread and four belt layers are existent in each of the side regions.

The circumferential belt layer structure 3 is comprised of four belt layers $3_{-1}$, $3_{-2}$, $3_{-3}$, $3_{-4}$ each containing the same organic fiber cords as in the cross belt layer and helically wound on the cross belt layer structure in the circumferential direction of the tire and continuously extending between both side regions of the tread, and two belt layers $3_{-5}$, $3_{-6}$ arranged at the central region of the tread and interposed between the cross belt layers disposed at both side regions of the tread.

Therefore, the number of circumferential belt layers existent in only the central region of the tread and the number of cross belt layers existent in only each side region of the tread are two, respectively. Moreover, the discontinuous point P between the cross belt layer and the circumferential belt layer is located at a distance from tread center corresponding to 50% of a length between a center of tread ground contact width L and a ground contact end (L/2).

FIG. 2 illustrates another embodiment of the airplane tire according to the invention having substantially the same structure as in the tire of FIG. 1, except that each inwardly folded end of the cross belt layer $2_{-1}$ is further bent so as to wrap an end A of each of the cross belt layers $2_{-3}$, $2_{-4}$ for preventing the shearing strain produced at the end A. A pair of circumferential belt layers $3_{-7}$, $3_{-8}$ are disposed on the circumferential belt layer $3_{-6}$ at only both side regions of the tread.

FIGS. 3a~3d illustrate some embodiments of another belt structure according to the invention, wherein a solid line is a cross belt layer constituting the cross belt layer structure 2 and a dotted line is a circumferential belt layer constituting the circumferential belt layer structure 3.

In the invention, the cord used for the belt layer is made from the organic fiber because the organic fiber cord is shrunk by heat and particularly produces a heat shrinkable stress through vulcanization heat to increase an initial tension of cord in the circumferential belt layer at the inflation of internal pressure without loading, which effectively acts to restrain the standing wave.

On the other hand, the number of belt layers is required to be more than a certain number in order to satisfy the pressure resistance in the airplane tire. The growth of outer diameter of the tire under the inflation of internal pressure, particularly the growth of the belt is large at the central region of the tread being small in the growth restraining effect through the sidewall, which depends upon the breakage of the belt in the pressure test as shown in FIG. 4. However, the deformation of the belt is small at the central region of the tread during the running under loading but becomes larger toward the ground contact end of the tread shoulder having a large difference in the outer diameter as compared with the tread central region, so that it is sufficient to ensure the extending and contracting properties of the belt at the tread shoulder for preventing the irregular wear of the shoulder. The arrangement of the circumferential belt layer in the central region of the tread does not participate in the undesirable occurrence of uneven wear because the deformation of the belt is small at the tread central region under loading.

In the belt composed of the combination of cross belt layer structure and the circumferential belt layer structure, therefore, the number of circumferential belt layers at the central region of the tread is made larger than that at each tread side region inclusive of ground contact end, while the number of cross belt layers at each tread side region is made larger than that at the tread central region. Thus, tires satisfying the prescribed pressure test can be provided without excessively increasing the number of belt layers, and also the heat buildup of the belt can be suppressed to simultaneously improve the service durability and the resistance to uneven wear.

However, when the circumferential belt layers are arranged at only the central region of the tread, the tread shoulder grows outward through the centrifugal force during the running at high speed, which is apt to produce the standing wave and induce the separation failure at the belt end. Therefore, at least one of the circumferential belt layers is required to continuously extend between both side regions of the tread.

In the practice of the invention, it is further advantageous to satisfy each of the following requirements.

In order to enhance the service durability by suppressing the total thickness of the belt at the central region of the tread, the cross belt layers arranged at only the side regions and the circumferential belt layer arranged at only the central region are disposed so as to form a substantially single layer. In this case, the discontinuous point P between the cross belt layer and the circumferential belt layer is preferably located at a distance from the tread center corresponding to 35~75% of a length between the center of ground contact width of the tread and the ground contact end as seen from the following discussion.

FIG. 4 illustrates the elongation distribution of belt cord in the circumferential direction in the pressure test or during the running under loading by an index on the basis that the maximum value is 100. When the position of discontinuous point P is less than 35% of the length between the ground contact width center and the ground contact end, the elongation of cord is large in the pressure test but the belt deformation at the center of ground contact width is small during the running under loading. When it exceeds 75%, the elongation of cord becomes large at the shoulder region or the tread side region. Therefore, when the position of discontinuous point P is within the above range, the circumferential belt layer at the central region of the tread effectively contributes to ensure the rigidity in the pressure test, while the circumferential belt layer at the side region restrains the belt deformation during the running under loading through the extensible cross belt layer is arranged at the shoulder region exhibiting a large deformation, so that the resistance to uneven wear is not damaged.

If the cross belt layers are arranged at only the side regions, only the circumferential belt layers are existent in the central region of the tread, so that the rigidity in the rotational axis direction of tire and the shearing rigidity become extremely low and a great difference in rigidity is produced between the side region and the central region to cause the stress concentration in the boundary therebetween, and consequently it is apt to cause troubles such as separation failure and the like. Therefore, it is desirable that at least one of the cross belt layers continuously extends between both side regions of the tread. Moreover, it is favorable that at least one of the cross belt layers is a folded layer from a viewpoint of mitigation of interlaminar stress concentration at the free end of the cross belt layer.

The belt structure extensible in the circumferential direction of tire during running under loading can mitigate the shearing deformation of the tread resulting from the difference in outer periphery between the center of the tread and the shoulder portion thereof to suppress the uneven wear due to the dragging of the shoulder. Further, the belt structure is subjected to a bending deformation just beneath a load during the running under loading, so that the cords of the belt layer are more extended in the circumferential direction at an area separated away from the tread surface or an area adjacent to the carcass. Therefore, it is effective to arrange the cross belt layer extensible in the circumferential direction in such an area.

Since the cross belt layer is low in the circumferential rigidity as compared with the circumferential belt layer, when the difference in the number of cross belt layers between the central region and the side region of the tread is equal to the difference in the number of circumferential belt layers between the central region and the side region, the circumferential rigidity a the side region is low. Such can be compared with the case of the central region because the ratio of cross belt layer number to total belt layer number is large and consequently the belt structure has an unbalanced circumferential rigidity in the axial direction.

As a result, the tread size at the side region is apt to grow as compared with the central region, so that the radius of curvature of tread profile in radial section becomes larger at the side region than at the central region. Particularly, the ground contact pressure at the side region increases during the running under loading such as over-loading condition (i.e. one of double wheel is punctured), whereby the heat buildup of the tread is apt to be increased to cause separation failure between the tread and the belt. Viewed from this point, it is desirable that the difference in the number of circumferential belt layers between the central region and the side region is made smaller than the difference in the number of cross belt layers between the central region and the side region so as to reduce the unbalance of circumferential rigidity between the central region and the side region.

Even in such a belt structure, the belt is subjected to a bending deformation in the thickness direction under loading, and a large deformation is applied to an area near the carcass. Therefore, when the number of cross belt layers is made large at the side region near the carcass showing a large elongation in the circumferential direction during the running under loading, the resistance to uneven wear is improved. In this case, even when the difference in the number of circumferential belt layers between the central region and the side region is made small, the resistance to uneven wear is maintained. However, it is required to make the number of circumferential belt layers at the side region smaller than that at the center region for preventing uneven wear.

According to the invention, it is possible to take a belt structure wherein the circumferential belt layer to be arranged at only the central region is not disposed between the cross belt layers arranged at only both side regions. In this case, however, even when the space between the cross belt layers arranged at only both side regions is filled with a rubber sheet, a part of the circumferential belt layer arranged above the cross belt layer structure falls down into the space due to the rubber flowing at the vulcanization and the shrinking of the belt cord. Consequently, it is apt to cause poor tire production due to the disorder of the belt structure. Therefore, it is more desirable that a pair of circumferential belt layers are further arranged on the outermost circumferential belt layer of the circumferential belt layer structure at both side regions of the tread. In this case, the end of the additional circumferential belt layer facing the tread center is located at a distance from the tread center corresponding to 35~75% of the length between the center of the ground contact width and the ground contact end in view of the rigidity balance between the central region and the side region.

The invention will be described with reference to the following example.

EXAMPLE

There were provided four test tires for airplanes with a tire size of H46×18.0R 20 as shown in FIG. 1, wherein each of four carcass plies contained cords of nylon 66 (1680d/3) arranged at an angle of approximately 90° with respect to the circumferential direction of the tire. In these tires, the belt had a belt structure as shown in FIGS. 5a~5d, wherein numeral 2 was a cross belt layer structure and numeral 3 a circumferential belt layer structure.

The weight of belt structure, burst pressure through pressure test, belt durability and resistance to uneven wear (wear loss of rib at shoulder) were measured with respect to these tires to obtain results as shown in the following Table 1 together with dimensions of the belt structure.

Moreover, the discontinuous point between the circumferential belt layer and the cross belt layer in Examples was set to a position corresponding to 50% of the length between the center of ground contact width and the ground contact end.

TABLE 1

| Belt structure (corresponding to FIG. 5) | | | FIG. 5a | FIG. 5b | FIG. 5c | FIG. 5d |
|---|---|---|---|---|---|---|
| Circumferential belt layer (dotted line) | Number of layers | tread central region | 6P | 4P | 7P | 6P |
| | | tread side region | 4P | 4P | 7P | 5P |
| | Angle (degree) | | 0 | 0 | 0 | 0 |
| | cord material | | nylon 66 | nylon 66 | nylon 66 | nylon 66 |
| | cord kind | | 1680 d/4 | 1680 d/4 | 1680 d/4 | 1680 d/4 |
| | end count/5 cm | | 34 | 34 | 34 | 34 |
| Cross belt layer (solid line) | Number of layers | tread central region | 2P | 6P | — | 2P |
| | | tread side region | 4P | 6P | — | 4P |
| | Angle (degree) | | R18-L18-R18-L18 | R18-L18-R18-L18 | — | R18-L18-R18-L18 |
| | cord material | | nylon 66 | nylon 66 | — | nylon 66 |
| | cord kind | | 1680 d/4 | 1680 d/4 | — | 1680 d/4 |
| | end count/5 cm | | 34 | 34 | — | 34 |
| Weight of belt structure (index) | | | 100 | 125 | 88 | 106 |
| Burst pressure through pressure test (index when the service pressure is 100) | | | 425 | 420 | 430 | 425 |
| Belt durability | | | complete running of 50 times (no crack in belt) | occurrence of belt separation after the running of 40 times | complete running of 50 times (no crack in belt) | complete running of 50 times (no crack in belt) |
| Wear loss of rib at shoulder (index when rib at tread center is 100) | | | 115 | 105 | 260 | 115 |
| Tread side region temperature (index) | | | 100 | 114 | 98 | 85 |
| Remarks | | | Example | Comparative Example | | Example |

In Table 1, the pressure test and the test for belt durability were performed according to the FAA standard. As to belt durability, the take-off simulation, wherein the tire was run under loading while raising the speed from 0 MPH to 225 MPH and then the loading was removed, was repeated 50 times, and thereafter the tire was cut out to observe the cracked state of the belt.

The resistance to uneven wear was evaluated by a wear promoting test on a drum. After the end of the test, the wear loss of rib at the shoulder portion of the tread was measured and represented by an index on the basis that the wear loss of rib at the central region of the tread was 100. As the index value approaches 100, the wear loss of shoulder rib becomes equal to the wear loss of central rib, which shows the improvement of the resistance to uneven wear at the shoulder portion.

The tread side region temperature was evaluated by take-off simulation test under 150% over-load through an infrared thermography and represented by an index on the basis that the tire of FIG. 5a was 100. The smaller the index value, the lower the heat buildup.

As seen from Table 1, in the tires according to the invention, the pressure resistance is satisfied without excessively increasing the belt weight and damaging the belt durability, and at the same time the resistance to uneven wear can largely be improved.

As mentioned above, the invention can simultaneously improve the service durability and resistance to uneven wear in the pneumatic radial tire for airplanes, which have never been achieved in the conventional technique, in a high level.

What is claimed is:

1. A pneumatic radial tire for airplanes, comprising; a toroidal carcass composed of plural plies each containing organic fiber cords arranged in parallel with each other and at a cord angle of 70°~90° with respect to an equatorial plane of the tire, at least one of which plies is being wound around each of a pair of bead cores from inside of the tire toward outside thereof to form a turnup, and a belt superimposed about a crown portion of said carcass and composed of a combination of cross belt layer structure and a circumferential belt layer structure; a tire tread over said belt, said tire tread having an axially extending central region with adjacent side regions disposed axially next to said central region; said cross belt layer structure being comprised of at least two cord layers each containing organic fiber cords arranged in parallel with each other and at a cord angle of 10°~70° with respect to the equatorial plane of the tire, the cords of said layers being crossed with each other; said circumferential belt layer structure being comprised of at least two cord layers each containing organic fiber cords arranged in parallel with each other and substantially in parallel to the equatorial plane of the tire; the number of cord layers at a side region of the tire tread in said cross belt layer structure being larger than that at a central region thereof, and the number of cord layers at the central region of the tread in said circumferential belt layer structure being larger than that at the side region thereof, and at least one of said cord layers in said circumferential belt layer structure being a continuous layer extending between both side regions of the tread.

2. The pneumatic radial tire for airplanes according to claim 1, wherein said cross belt layers arranged only on both side regions of the tread and the circumferential belt layer arranged on the central region of the tread and located at substantially an equal distance from the rotational axis of the tire and forming substantially a single, and a discontinuous point between the cross belt layer and the circumferential belt layer is located at a distance from the tread center corresponding to 35~75% of a length between the center of the ground contact width of the tread and the ground contact end.

3. The pneumatic radial tire for airplanes according to claim 1, wherein at least one of said cross belt layers is a continuous layer extending between the both side regions of the tread.

4. The pneumatic radial tire for airplanes according to claim 1, wherein cords of said circumferential and cross belt layers are made from the organic fibers of the same material.

5. The pneumatic radial tire for airplanes according to claim 1, wherein at least one of said cross belt layers is a folded layer.

6. The pneumatic radial tire for airplanes according to claim 1, wherein an absolute value of the difference in the number of circumferential belt layers between the central region and the side region is smaller than an absolute value of the difference in the number of cross belt layers between the side region and the central region.

7. The pneumatic radial tire for airplanes according to claim 1, wherein a pair of circumferential belt layers are further arranged outward in the radial direction of the tire on only both side regions of the circumferential belt layer continuously extending between both side regions of the tread, and ends thereof facing the tread center plane are located at a distance from the tread center plane corresponding to 35~75% of a length between the center of the ground contact width of the tread and the ground contact end.

8. The pneumatic radial tire for airplanes according to claim 1, wherein said cross belt layer arranged most inward in the radial direction of the tire is adjoined to said carcass.

* * * * *